(12) United States Patent
Boisdequin et al.

(10) Patent No.: US 9,341,271 B2
(45) Date of Patent: May 17, 2016

(54) DRIVE DEVICE OF A REGULATION VALVE FOR CASTING LIQUID METAL

(75) Inventors: Vincent Boisdequin, Naast (BE);
Jeffrey Butts, Veedersburg, IN (US);
Jason Quinn, Mahomet, IL (US)

(73) Assignee: Vesuvius Group S.A., Ghlin (BE)

( * ) Notice: Subject to any disclaimer, the term of this patent is extended or adjusted under 35 U.S.C. 154(b) by 211 days.

(21) Appl. No.: 13/201,952

(22) PCT Filed: Feb. 16, 2010

(86) PCT No.: PCT/EP2010/000928
§ 371 (c)(1),
(2), (4) Date: Sep. 6, 2011

(87) PCT Pub. No.: WO2010/094447
PCT Pub. Date: Aug. 26, 2010

(65) Prior Publication Data
US 2012/0037831 A1    Feb. 16, 2012

(30) Foreign Application Priority Data

Feb. 18, 2009 (EP) .................................. 09153150

(51) Int. Cl.
*B22D 41/08* (2006.01)
*F16K 1/36* (2006.01)
(Continued)

(52) U.S. Cl.
CPC ............... *F16K 1/36* (2013.01); *F15B 15/1466* (2013.01); *F16K 1/48* (2013.01)

(58) Field of Classification Search
CPC B22F 2009/0892; B22D 41/56; B22D 41/50; B22D 41/38; F15B 15/1466; F16K 1/48; F16K 1/36

USPC ................. 222/594, 597, 600, 236; 266/236; 251/324
See application file for complete search history.

(56) References Cited

U.S. PATENT DOCUMENTS 3,679,244 A    7/1972  Reddy
4,042,207 A *  8/1977  Nehrlich et al. ................ 251/62
4,199,085 A *  4/1980  Watts et al. ................... 222/600
(Continued)

FOREIGN PATENT DOCUMENTS

BE          1000392 A4     11/1988
JP          H4-300057      10/1992
(Continued)

OTHER PUBLICATIONS

Jungbauer A et al: "Cast floor robotics: Concept and test results { DOI: 10.1051/metal : 2008032 }" Revue De Metallurgie. Cahiers D'Informations Techniques Apr. 2008 La Revue De Metallurgie FR, vol. 105, No. 4, pp. 206-211, XP002528719 DOI: 10.1051/metal : 2008032 paragraph [Mounting of the slide gate cylinder] figures 2-4. Steiner B et al.: "Automationsloesungen fuer Pfannenschieberanwendungen", Stahl Und Eisen, Verlag Stahleisen, Dusseldorf, DE, vol. 128, No. 11, Nov. 12, 2008, pp. 99-112, XP001519747 ISSN: 0340-4803 figures 4,5,7 paragraph [Automation.Der.Pfannenschieberzustellung].

*Primary Examiner* — Scott Kastler
*Assistant Examiner* — Michael Aboagye
(74) *Attorney, Agent, or Firm* — Thomas Clinton; Donald M. Satina

(57) ABSTRACT

A device for driving a regulation valve for casting liquid metal contains a main rod controlling the opening and closing of the valve, and a coupler linking the main rod and the valve. The device also contains a coupler controller able to activate and deactivate the coupler, enabling linkage and detachment of the main rod and the valve.

12 Claims, 3 Drawing Sheets

(51) Int. Cl.
*F15B 15/14* (2006.01)
*F16K 1/48* (2006.01)

(56) References Cited

U.S. PATENT DOCUMENTS 4,596,345 A * 6/1986 Beckers ................ 222/600
6,045,015 A * 4/2000 Waltenspuhl et al. ........ 222/600

2007/0029709 A1 2/2007 Keller
2008/0314938 A1 12/2008 Ebner et al.

FOREIGN PATENT DOCUMENTS

JP   H8-243694      9/1996
SU   609597         6/1978
WO   2009/010153 A  1/2009

* cited by examiner

Fig. 1b  ← X

DRIVE DEVICE OF A REGULATION VALVE FOR CASTING LIQUID METAL

BACKGROUND OF THE INVENTION a) Field of the Invention

The present invention concerns the technical field of the continuous casting of liquid metal, for example liquid steel.

b) Description of the Related Art

In a liquid metal casting installation, the liquid metal is generally transferred from a pouring ladle to a distributor, intended to distribute the liquid metal in casting moulds. In order to transfer the liquid from the ladle to the distributor, a regulation valve is generally used, disposed at the bottom of the pouring ladle. This regulation valve, referred to as a "slide valve", is generally composed of two superimposed plates, sliding one with respect to the other so that the valve can take a closed configuration, during which the pouring ladle can be moved, and an open configuration, allowing liquid to pass for transfer thereof into the distributor. To provide the opening and closing of the regulation valve, a device is used for driving the valve, attached to the pouring ladle or to the valve, when the pouch arrives close to the distributor.

An example of a driving device is described in the document U.S. Pat. No. 6,045,015. This driving device comprises a hydraulic actuator, provided with a cylinder temporarily fixed to the valve. The end of the rod of the actuator is also coupled to one of the plates of the valve, to open or close it. For this purpose, the end of the rod comprises a coupling jaw in which one end of the moving part of the valve containing the moving plate snaps.

Thus, in order to mount the driving device on the valve, the cylinder of the actuator is first of all attached to the valve, and then the actuator rod and plate are coupled by moving the actuator rod in one direction, hereinafter referred to as the longitudinal direction. Later, at the end of the casting operations, in order to remove the driving device from the valve, the end of the moving plate of the jaw is withdrawn by effecting a sliding of the entire driving device (and therefore of the jaw) in a transverse direction, perpendicular to the longitudinal direction. Thus, as the driving device must be demounted by moving in the transverse direction, it is necessary to provide sufficient space under the pouring ladle for implementation thereof.

However, the bottom part of the pouring ladle is generally very encumbered, for example by reinforcements, feet of the ladle, arrangements for injecting bubbles in the bottom of the ladle, pipes, etc. As a result the step of demounting the driving device poses difficulties.

BRIEF SUMMARY OF THE INVENTION

The aim of the present invention is to propose a driving device, the mounting and demounting of which is simpler to implement.

To this end, a subject matter of the invention is a device for driving a regulation valve for casting liquid metal, comprising a main rod controlling the opening and closing of the valve, and a valve—main rod coupler (being a means of coupling the main rod to the valve), characterised in that it also comprises a coupler controller (being a means of controlling the coupling means), able to active and deactivate the coupling means.

Thus, rather than having to move the driving device in the transverse direction in order to decouple the valve, it is proposed to perform first of all a step of deactivating the coupling means, causing them to resume their initial configuration, and then to proceed with the demounting of the driving device. This demounting is thus simplified since it is no longer necessary to provide a transverse movement, in addition to the longitudinal movement performed for the coupling, for the specific demounting of the coupling means. Consequently it is no longer necessary to leave clear as large a space as previously under the pouring ladle.

Moreover, as the deactivation of the coupling means is controlled, this operation can be done at a distance, so that human intervention is not necessarily necessary for demounting the coupling means. This simplifies the operation since human intervention is generally tricky to implement because of the high level of heat in the bottom part of the ladle after pouring. In addition, controlling the activation or deactivation offers the possibility of completely automating the coupling and decoupling of the driving device with the regulation valve. In particular, it may be difficult to completely automate this coupling and decoupling when the movements must follow both a longitudinal direction and a transverse direction.

It should also be noted that the control means proposed make it possible to more easily control the opening and closing of the valve. This is because, when the valve is not coupled to a driving device, there exists a risk of accidental opening of the valve, for example following an impact during the movement of the pouring ladle. However, accidental opening during movement may cause considerable damage when the pouring ladle is filled with very hot liquid metal. To reduce this risk, providing the valve with a system for locking the valve in the closed position is known in the prior art. The valve then needs to be released before beginning the pouring operations. According to the invention, this release may advantageously be activated by the means of controlling the coupling means at the time of coupling of the valve.

The driving device can also comprise one or more of the following features.

- The means of controlling the coupling means comprise a coupling piston connected to a coupling rod, the end of the coupling rod being able to activate and deactivate the coupling means by sliding of the piston and coupling rod.
- The coupling rod is slidably mounted inside the main rod. Apart from the fact that it is thus if necessary possible to optimise the number of hydraulic connections of the driving device, providing the coupling rod in the main rod reduces the size of the driving device.
- The coupling means comprise at least one stud attached to the main rod, mounted so as to be able to move with respect to the main rod between an activated position, in which the stud extends transversely to the main rod while projecting from this rod so as to be able to couple the main rod and the valve, and a deactivated position, in which the stud is at least partially retracted in the main rod, so as to be able to decouple the main rod and the valve. Thus, when the stud is in the activated position, the projection produced on the main rod can allow anchoring of this rod in a corresponding housing in the regulation valve.
- The end of the main rod is intended to be received in a housing in the valve, the stud comprising a stop surface arranged to hold this end in the housing when the stud is in the activated position. In other words, the stud, in the activated position, provides a function of anchoring the end of the main rod in the valve housing. By virtue of this housing, any movement of the main rod gives rise to a similar movement of the valve housing, and therefore of one of the plates of the regulation valve, for opening or closing thereof.

The driving device comprises a coupling return (being a means of returning the coupling means to their deactivated position). It is possible for example to provide an arm driving the coupling means, able to be actuated by a spring, or by the coupling rod.

The driving device comprises a cylinder or driving device exterior casing intended to be received in a valve exterior housing, the device comprising a piston, referred to as the main piston, connected to the main rod, and comprising another piston, referred to as the fixing piston, arranged to fix the cylinder or driving device exterior casing relative to the valve exterior housing. It should be noted that the valve exterior housing can be provided directly on the regulation valve, or on the pouring ladle on which the regulation valve is mounted. This embodiment is particularly advantageous for facilitating the mounting of the cylinder or driving device exterior casing in the housing. This is because, in order to fix the cylinder or driving device exterior casing in the valve exterior housing, it is generally necessary to embed it in the valve exterior housing, reducing as far as possible the clearances between the cylinder and the valve exterior housing in order to prevent pressure drops. Because of this tight embedding, mounting of the cylinder or driving device exterior casing in the valve exterior housing may be relatively difficult to implement, particularly by a robot. By providing a second piston fixing the cylinder or driving device exterior casing to the valve exterior housing, it is possible to fix the cylinder whatever the size of the valve exterior housing in which it is received. This is because, by virtue of the fixing piston, it is possible to adjust the size of the cylinder once the latter is attached in the valve exterior housing, so as to eliminate or reduce clearances. In other words, according to a first step, the cylinder or driving device exterior casing can be introduced into the valve exterior housing, allowing the presence of a clearance, and, in a second step, the clearance can be compensated for, by moving the fixing piston, in order to make this clearance disappear. By making this clearance disappear, a pressure drop is avoided during the travel of the main piston, while allowing automation of the mounting of the cylinder or driving device exterior casing on the valve.

The device comprises a hydraulic chamber delimited on the one hand by the main piston and on the other hand by the fixing piston. Thus the fixing system can be provided without for all that requiring a complex structure for the driving device. In particular, it is not necessary to provide four distinct chambers for controlling the main piston and the fixing piston since a common hydraulic chamber is used for maneuvering the main piston and fixing piston.

The fixing piston has the main rod passing through it.

The means of controlling the coupling means comprise a coupling piston connected to a coupling rod, and the driving device is configured so that the main piston, the fixing piston and the coupling piston can be controlled by a control unit by means of three hydraulic connections to the unit, namely: a first connection between the unit and the hydraulic chamber delimited by the main piston and the fixing piston, a second connection between the unit and a hydraulic chamber delimited by the main piston and the cylinder, and a third connection between the unit and a channel connecting both a hydraulic chamber delimited by the fixing piston and the cylinder and a hydraulic chamber delimited by the coupling piston and the cylinder. This embodiment is particularly advantageous: only three connections to the control unit are used to control the movement of three distinct pistons, where it would have been possible to use six connections, namely two per piston. The device proposed is therefore particularly compact and does not require any expensive and complicated connection.

A return means is disposed around the main rod, under the head of the main piston. This return means can take the form of an elastic washer. It makes it possible to move the head of the main piston away and allows the injection of hydraulic fluid, thus preventing any risk of blocking.

The valve can be locked in the closed position, and the means controlling the coupling means also control means of locking the valve. Thus, by locking the valve, it is guaranteed that it does not risk opening during the movement of the pouring ladle. In addition, the same control means can control both the coupling means and the means of locking the valve.

Another subject matter of the invention is the assembly consisting of a driving device as described above and a regulation valve, also comprising a guidance element, comprising a housing receiving part of the driving device, a housing receiving part of the valve, and means of guiding the coupling means during movement thereof.

Another subject matter of the invention is a device for mounting and demounting a driving device as described above on a regulation valve and/or on a pouring ladle, arranged to ensure the automatic mounting and demounting of the driving device.

BRIEF DESCRIPTION OF THE SEVERAL VIEWS OF THE DRAWING

The invention will be better understood from reading of the following description, given solely by way of example and made with reference to the accompanying drawings, in which:

FIGS. 1a and 1b are views in section of a driving device according to one embodiment, comprising coupling means respectively in the deactivated position and in the activated position;

DETAILED DESCRIPTION OF THE INVENTION

Figure 1A:
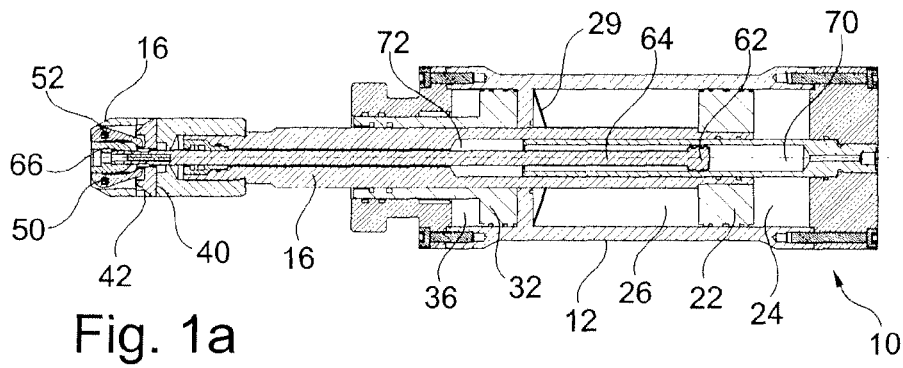

A casting installation generally comprises a distributor, for distributing liquid metal to casting moulds. This distributor is supplied with liquid metal by means of pouring ladles, movable above the distributor in order to provide this transfer. Each pouring ladle is provided with a valve regulating the pouring, often composed of a linear valve, referred to as a "slide valve". The opening or closing of this regulation valve is controlled by a driving device 10, shown in particular in FIGS. 1a and 2a. Generally this driving device comprises a cylinder or casing or driving device exterior casing 12, intended to be at least partially received in a housing 14 integral with the valve, mounted fixed in this valve exterior housing 14. This valve exterior housing 14 can be directly provided on the regulation valve, or on the pouring ladle on which the regulation valve is mounted. Moreover, the driving device 10 comprises a main rod 16 controlling the opening and closing of the valve, slidably mounted in the cylinder or driving device exterior casing 12, the end 18 of which is intended to be received in a housing 20 in the valve in order to be coupled to the latter. More precisely, the housing 20 in the valve is provided on a moving part 13 of the valve. In the case of a slide valve provided with two superimposed plates sliding one with respect to the other, the housing 20 is provided on the part 13 of the valve receiving the moving plate, the movement of the end 18 once coupled to the housing 20 making it possible to move this plate between a closed position and an open position of the valve.

Figure 2A:
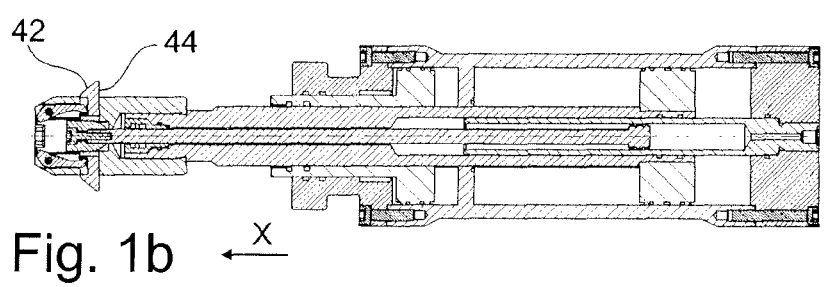
FIGS. 2a to 2f are schematic views in section illustrating the steps of functioning of a driving device similar to the one in FIGS. 1a and 1b.
Figure 2A:
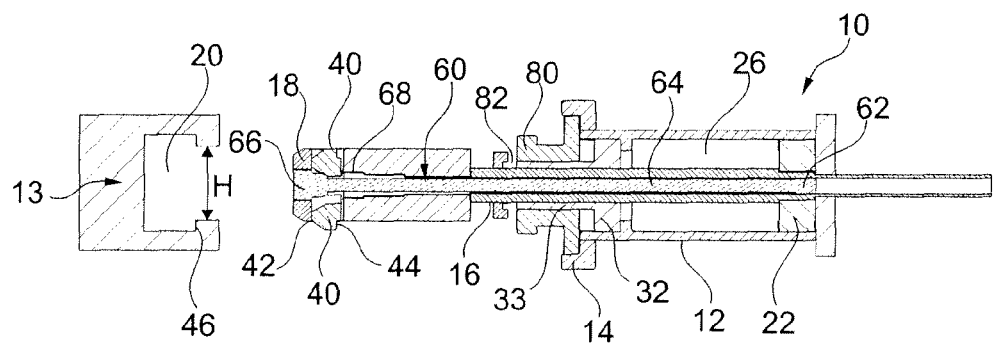
Figure 2B:
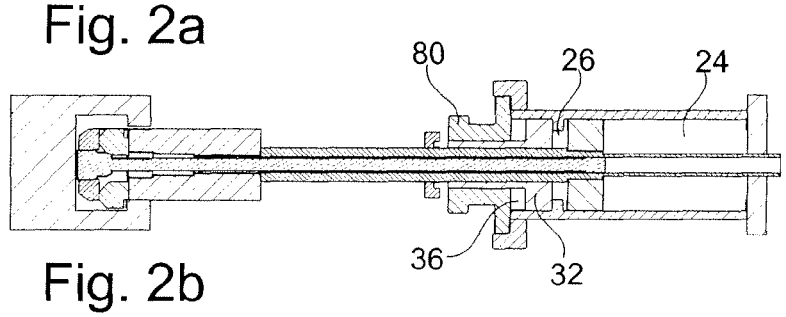
Figure 5:
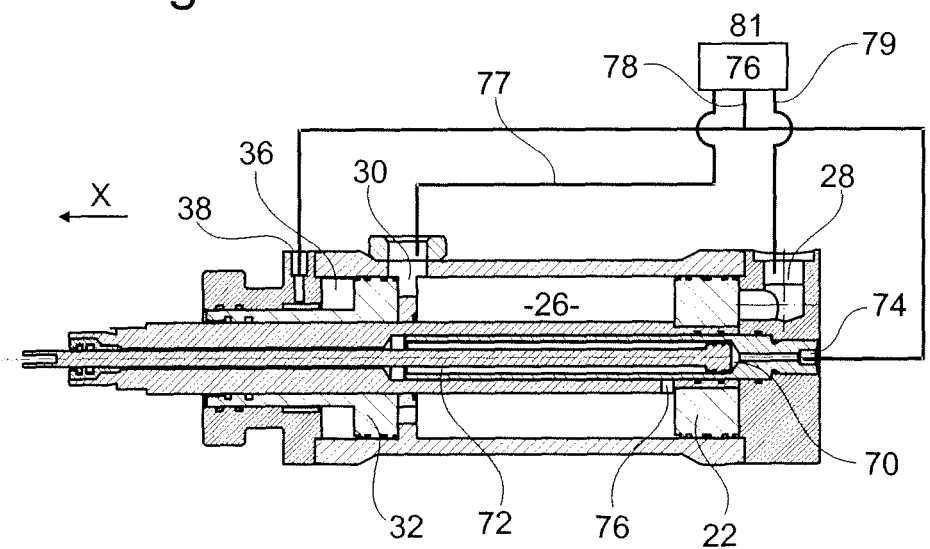
FIG. 5 is a view in partial section of a driving device similar to the one in FIGS. 1a and 1b, illustrating the hydraulic connections of this device.

The driving device 10 is provided with a first piston 22, referred to as the main piston, slidably mounted in the cylinder 12 and connected to the main rod 16 so that any movement of the piston 22 is transmitted to this main rod 16. The movement of this piston 22, and therefore of the main rod 16, opens or closes the regulation valve. As can be seen in FIG. 1a, or in FIG. 2d, the main piston 22 delimits, with the inside of the cylinder 12, first 24 and second 26 main hydraulic chambers. The first main chamber 24 is supplied with fluid by a supply channel 28, and the second main chamber 26 is supplied with fluid by a supply channel 30, as shown in FIG. 5. As can be seen in FIG. 1a, a return means 29 is disposed around the main rod 16, under the head of the main piston 22. This return means is for example an elastic washer. It moves away the piston head 22 and allows the injection of hydraulic fluid in the chamber 26, even when the piston 22 is at the end of travel.

Figure 2C:
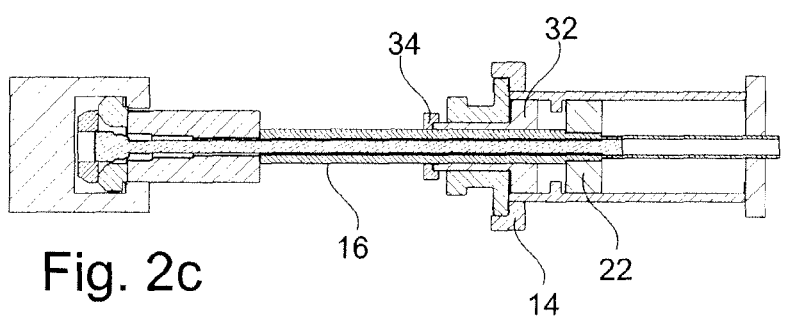
Figure 2D:
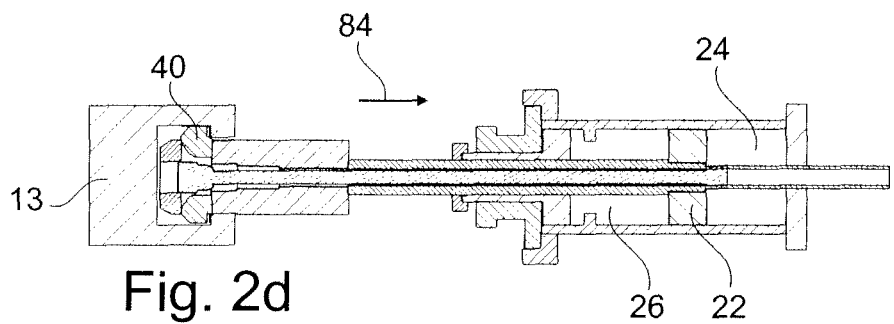
Figure 2E:
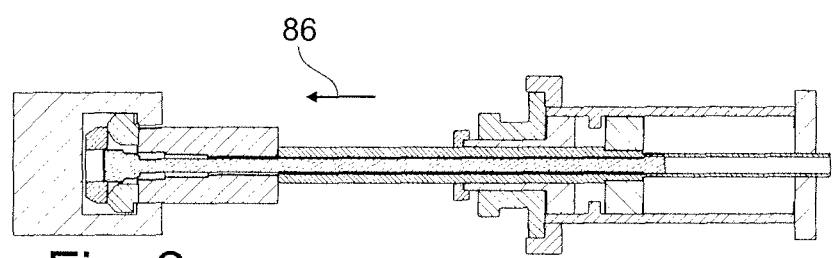

In addition, in order to fix the cylinder 12 in the housing 14, integral with the valve, the driving device 10 comprises a second piston 32, referred to as the fixing piston. This piston 32 is arranged to bear on a wall 34 of the housing 14, as can be seen in FIG. 2c, so as to lock by clamping the cylinder 12 with respect to the housing 14. More precisely, the second piston 32 comprising a skirt 33 intended to form a shim between the cylinder 12 and the wall 34 of the housing 14. The fixing piston 32 and the wall 34 of the housing 14 have the main rod 16 passing through them, so as to allow this rod 16 to slide under the effect of the movement of the piston 22. As can be seen in particular in FIG. 2b, the piston 32 delimits, with the cylinder 12, on the one hand the second main hydraulic chamber 26 and on the other hand a third hydraulic chamber 36, disposed in the front part of the cylinder (the front direction being indicated by the arrow X in FIG. 2a). Thus the second hydraulic chamber 26 is delimited on the one hand by the main piston 22 and on the other hand by the fixing piston 32. A common chamber is therefore used for acting on the two pistons, whence a saving in space. The third hydraulic chamber 36 is supplied with fluid by a supply channel 38, shown in FIG. 5.

The driving device 10 also comprises a valve—main rod coupler 40 (or means 40) of coupling the main rod 16 to a moving part 13 of the regulation valve, or more precisely coupling the end 18 of the rod 16 with the housing 20 in the valve. In this example, the coupling means comprise two studs, attached to the main rod 16, mounted so as to be able to move with a respect to the rod 16 between an activated position shown in particular in FIG. 2d, in which the studs extend transversely to the main rod 16 while projecting from this rod so as to be able to couple the main rod 16 and the moving part 13 of the valve, and a deactivated position, shown in particular in FIG. 2a, in which the studs are at least partially retracted in the main rod 16, so as to be able to decouple the main rod 16 and the moving part 13 of the valve. More precisely, when they are in the deactivated position, the maximum diameter of the end 18 of the rod 16 is less than height H of an opening in the housing 20, as can be seen in FIG. 2a. Thus, in the deactivated position of the studs, the end 18 can pass inside the housing 20, from the position illustrated in FIG. 2a as far as the position illustrated in FIG. 2b. To facilitate this passage of the end 18 inside the housing 20, that is to say to prompt the studs to adopt their deactivated position, a bevelled surface 42 can be provided in front of the studs. Moreover, the studs each comprise a stop surface 44, arranged to hold the end 18 of the rod 16 in the housing 20 when the studs are in the activated position. This stop surface 44 cooperates with a stop surface 46 provided in the housing 20.

Figure 3:
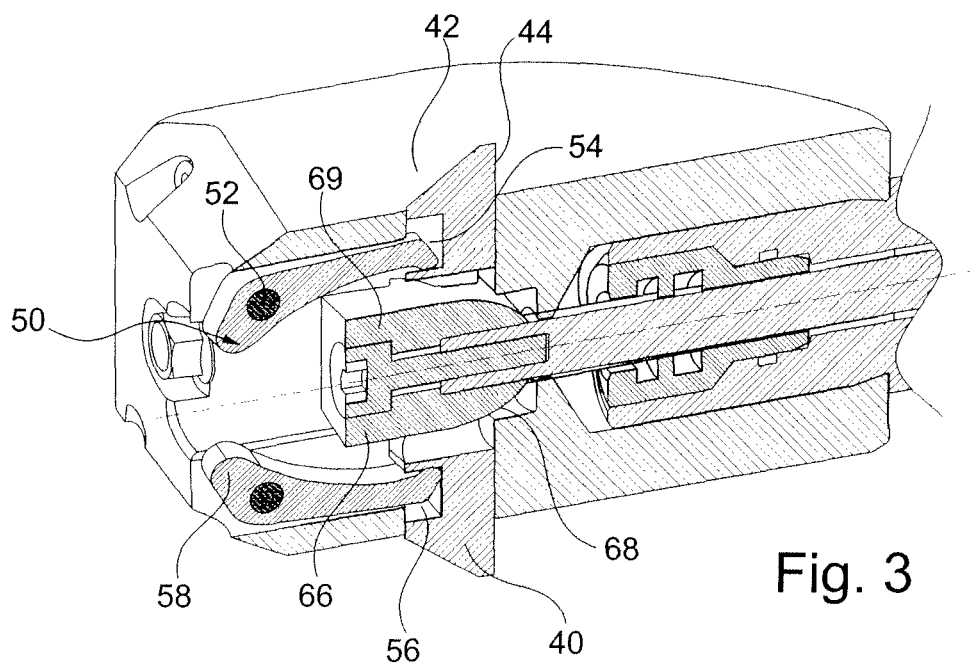
FIG. 3 is a perspective view in section of the end of a main rod of a driving device similar to the one in FIGS. 1a and 1b.

The end 18 also comprises a coupling return 50 (or means 50) configured to return the coupling means 40 to the deactivated position, visible in particular in FIGS. 1a, 1b and in FIG. 3. These means 50 comprise two arms each mounted pivotally about an axis 52, each comprising an end 54 cooperating with the studs, cooperating with a recess 56 provided in the front wall of the studs, and an activation end 58 described more precisely hereinafter.

The driving device 10 also comprises coupler controller 60 (or means 60) configured to control the coupling means 40, and able to activate and deactivate them. These means 60 comprise a coupling piston 62, connected to a coupling rod 64, the end 66 of which, opposite to the piston 62, is able to activate and deactivate the coupling means 40, by sliding. More precisely, the end 66 of the rod 64 is splayed. It has a rear surface 68, able to form a ramp with the studs so as to make them pass into their activated or deactivated position when the rod 64 slides, as described hereinafter. Moreover, the end 66 has a front part 69 comprising a substantially flat surface configured to come into abutment against the bottom of the housing 20. Moreover, the front part 69 is arranged to cooperate with the end 58 of the arms, so as to return the coupling means 40 into the deactivated position, as described hereinafter.

The coupling rod 64 and the coupling piston 62 are mounted slidably inside the main rod 16 of the device 10. More precisely, as can be seen in FIG. 1a, the piston 62 delimits, with the main rod 16, fourth 70 and fifth 72 hydraulic chambers for moving the piston 62 inside the main rod 16 under the action of a fluid. The rear hydraulic chamber 70 is supplied with fluid by virtue of a channel 74, shown in FIG. 5. Moreover, the front hydraulic chamber 72 is supplied with fluid by virtue of a passage 76 communicating with the second main hydraulic chamber 26. Thus, like the chamber 26, it is through the channel 30 that the front chamber 72 is supplied with fluid.

The hydraulic connections of the driving device 10 to a control unit 81 will now be described. The device 10 is configured so that the main piston 22, the fixing piston 32 and the coupling piston 62 can be controlled by the control unit 81 by means of three hydraulic connections 77, 78, 79, namely:
  a first connection 77 between the unit 81 and the hydraulic chamber 26 delimited by the main piston 22 and the fixing piston 32,
  a second connection 79 between the unit 81 and the hydraulic chamber 24 delimited by the main piston 22 and the cylinder 12, and
  a third connection 78 between the unit 81 and the channel connecting both the hydraulic chamber 36 delimited by the fixing piston 32 and the cylinder 12, and the hydraulic chamber 70 delimited by the coupling piston 62 and the cylinder 12. It will therefore be noted that the supply channels 74 and 38 are connected to each other.

The mounting of the driving device 10 on a pouring ladle will now be described with reference to FIGS. 2a to 2f.

Generally the driving device 10 is installed on a pouring ladle when this pouring ladle is in an intermediate position, a position for example during which another pouring ladle is in the process of being emptied into the distributor. When the pouring ladle arrives in this intermediate position, it is filled with liquid metal and the regulation valve is closed. The driving device 10 is then attached under the ladle, in the immediate vicinity of or very close to the valve. The mounting of the device 10 commences with introduction of the cylinder or driving device exterior casing 12, or at least a front part 80 of the cylinder or driving device exterior casing 12, in the valve exterior housing 14, in the configuration illustrated in FIG. 2a. In this configuration, the fixing piston 32 is in the retracted position in the cylinder or driving device exterior casing 12, that is to say the chamber 36 has a substantially maximum volume. Thus the piston 32 and the skirt 33 do not project from the cylinder or driving device exterior casing 12, or only a little, so that the length of the cylinder or driving device exterior casing 12 is relatively short. As a result the part 80 of the cylinder or driving device exterior casing 12 can easily be inserted in the valve exterior housing 14, by virtue of a clearance 82. At the time of this insertion of the cylinder or driving device exterior casing 12 in the valve exterior housing 14, the supplies to the hydraulic chambers 24, 26, 36, 70, 72 are in the neutral position, that is to say the pistons 22, 32 and 62 are immobile. In this configuration, the main piston 22 (and therefore the main rod 16), just like the fixing piston 32, is in the retracted position inside the cylinder or driving device exterior casing 12, and hence there is a certain compactness of the device 10 at the time of fixing of the cylinder or driving device exterior casing 12 on the valve. The coupling piston 62 and the coupling rod 64 are for their part in the deployed position, the splayed end 66 arriving substantially flush with the end 18 of the main rod 16, and the coupling means 40 being in the deactivated position, as illustrated in FIG. 1a.

Once the cylinder 12 is disposed inside the housing 14, fluid is injected through the channel 28, so as to move the main piston 22 towards the front X (FIG. 5). Because of this movement, the main rod 16 also moves in the forward direction, and its end 18 passes inside the housing 20, as illustrated in FIG. 2b, until the end 18 arrives in abutment in the bottom of the housing 20. Once the end 18 is in abutment in the housing 20, fluid is injected into the second hydraulic chamber 26, through the channel 30, while preventing fluid being able to emerge from the channel 28. This injection of fluid through the channel 30 has two effects. This is because the increase in liquid inside the chamber 26 moves the fixing piston 32 forwards, so that the skirt 33 projects outside the part 80 of the cylinder 12 and comes into abutment against the wall 34 of the housing 14, which has the effect of clamping the cylinder in the housing 14 and therefore locking it. Simultaneously (or a little after, or a little before), the passage of liquid in the chamber 26 makes it possible, by virtue of the passage 76, to increase the quantity of fluid inside the front chamber 72, and therefore to move the coupling piston 62 towards the rear, so as to make the coupling rod 64 retract with respect to the rod 16, as shown in FIG. 2c. Because of this movement of the coupling rod 64, the end 66 retracts inside the end 18, which moves the coupling means 40 from their deactivated position to their activated position. In other words, the studs emerge from the end 18, by ramp effect.

Once the fixing piston 32 is in the position of fixing the cylinder in the housing 14, and the coupling rod 64 is in the retracted position in the rod 18, in order to activate the studs, the channel 28 is unblocked, while continuing to inject fluid into the channel 30. As a result the main piston 22 moves towards the rear, so as to make the end 18 of the main rod 16 retract slightly. As a result the walls 44 of the studs come into abutment against the walls 46 of the housing 20. In this position, the valve and the driving device 10 are coupled. The valve can therefore be opened or closed, by movement of the main piston 22 in the cylinder 12, by virtue of the injection of fluid through the channel 30 or through the channel 28. Thus, in the configuration illustrated in FIG. 2d, when the main piston 22 retracts in accordance with the arrow 84, it drives the valve, or more precisely one of the plates of this valve, in order to open the valve. In the configuration illustrated in FIG. 2e, when the piston 22 is moved forward, in accordance with the arrow 86, it closes the valve.

Figure 2F:
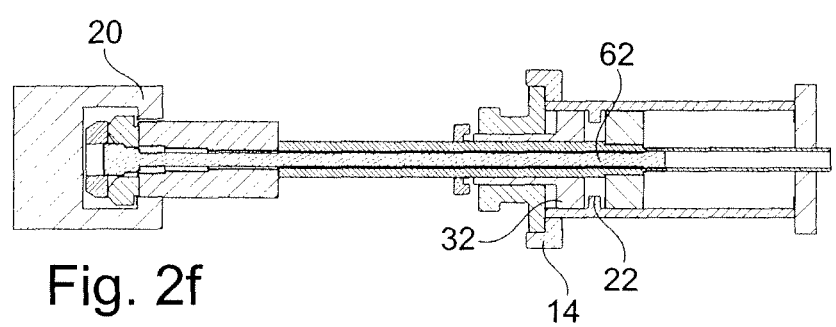

When it is wished to demount the driving device 10 from the pouring ladle, the following procedure is adopted. First of all the valve is closed, by disposing the piston 22 as shown in FIG. 2f. Fluid is then injected into the channels 38 and 74, which has the dual effect of moving the piston 34 towards the rear, and therefore releasing the cylinder 12 with respect to the housing 14, and moving the piston 62 forwards, therefore putting the blocking means 40 back in the deactivated position. It should be noted that, when the end 66 advances forwards, it cooperates with the end 58 of the arms, which pivots their end 54 towards the centre and therefore returns the studs to the deactivated position. In this deactivated position of the studs, it is possible to withdraw the end 18 from the housing 20, possibly previously having moved the piston 22 towards the rear, and then easily removing the driving device from the housing 14.

Figure 4A:
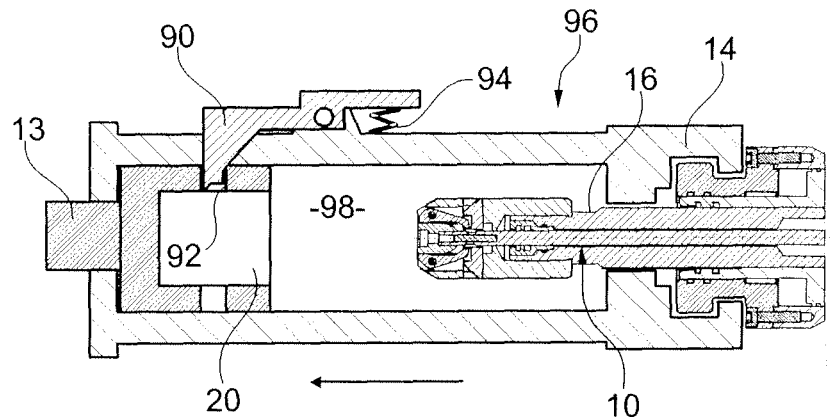
FIGS. 4a and 4b are views in schematic section of a driving device similar to the one in FIGS. 1a and 1b, assembled on a guidance element.
Figure 4B:
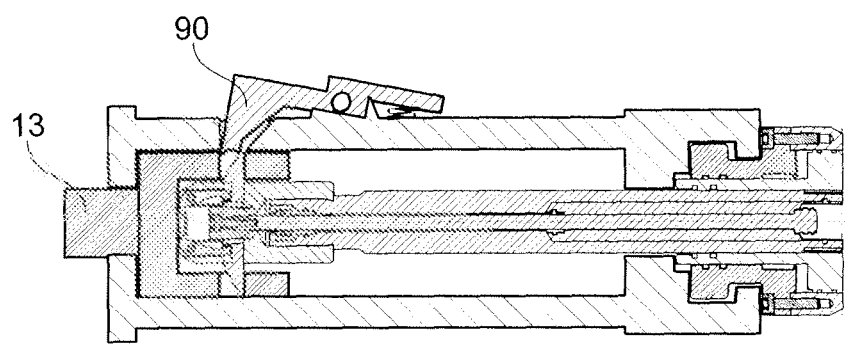

According to one advantageous embodiment, illustrated in FIGS. 4a and 4b, the valve can be locked in the closed position, which prevents the risks of accidental opening during movement thereof. To this end, valve locking device 90 and valve unlocking device 92 (being locking and unlocking means 90, 92) are provided, comprising a latch cooperating with a slot provided on the valve, in the housing 20. This latch is returned to the locked position by virtue of a spring 94. The latch is carried in this example by a guidance element 96, mounted fixed with respect to the pouring ladle and with respect to the fixed part of the regulation valve, forming a kind of extension of the valve. This element 96 carries a housing 14 for the cylinder, similar to the one described previously, and also comprises a valve—main rod coupler guide, or rail, 98 for guidance of the movable part 13 of the valve, in which the housing 20 of the moving part 13 can slide.

The means 62, 64 of controlling the coupling means 40 advantageously control the unlocking means 90, 92. This is because, before the coupling between the device 10 and the moving part 13 of the valve is implemented, the latter is in the locked position, illustrated in FIG. 4a. Then, once the cylinder or driving device exterior casing has been introduced into the valve exterior housing 14 and the main rod 16 inside the housing 20, the movement of the studs, under the effect of the sliding of the coupling piston 62, gives rise to a movement of the locking means 90, from their locked position to their unlocked position, illustrated in FIG. 4b. More precisely, the bevelled surface 42 cooperates with a bevelled surface of the latch 92 in order move it upwards in order to make it leave the slot 92 and thus release the moving part 13 of the valve. Moreover, when the device 10 is demounted, advantageously also, when the studs pass into the deactivated position and the valve is closed, the latch is once again placed in the slot, under the effect of the means 94, which locks the valve in the closed position.

It will be understood that the method described above can easily be automated. Thus it is possible to provide a robot for mounting and demounting the device 10, arranged to provide the automatic mounting and demounting of the device 10.

It should be noted that the invention is not limited to the embodiment described above.

Among the variants of the driving device, it should be noted that the means 50 of returning the coupling means into the deactivated position may not be actuated by the coupling rod 64 but comprise springs, for example acting on the studs so that they resume their deactivated position.

A person skilled in the art will easily be able to transpose this teaching to any device used in the continuous casting of a metal actuated by an actuator that has to be attached at the time of use thereof, such as for example a device for changing pouring tube, a distributor slide, a device controlling a stopper rod, etc.

Numerous modifications and variations of the present invention are possible. It is, therefore, to be understood that within the scope of the following claims, the invention may be practiced otherwise than as specifically described.

We claim:

1. Device for driving a regulation valve for casting liquid metal, comprising a main rod having a longitudinal dimension, the main rod controlling the opening and closing of the valve by manipulation of an element of the valve in a longitudinal direction, and a valve—main rod coupler, wherein the device further comprises a coupler controller configured to control the valve—main rod coupler, wherein the coupler controller comprises a coupling piston connected to a coupling rod wherein the device further comprises a driving device exterior casing configured to be at least partially received in a valve exterior housing, wherein the device further comprises a main piston connected to the main rod, and wherein the device further comprises a fixing piston configured to clamp the driving device exterior casing relative to the valve exterior housing, and wherein controlling, coupling the valve and the main rod, and decoupling the valve from the main rod are performed in a longitudinal direction.

2. Device according to claim 1, wherein the coupler controller comprises a coupling piston connected to a coupling rod having an end, wherein the end of the coupling rod is configured to activate and deactivate the valve—main rod coupler by sliding of the piston and coupling rod.

3. Device according to claim 2, wherein the coupling rod is slidably mounted inside the main rod.

4. Device according to claim 1, wherein the valve—main rod coupler comprises at least one stud attached to the main rod, mounted so as to be able to move with respect to the main rod between
   an activated position, in which the stud extends transversely to the main rod while projecting from this rod so as to be able to couple the main rod and the valve, and
   a deactivated position, in which the stud is at least partially retracted in the main rod, so as to be able to decouple the main rod and the valve.

5. Device according to claim 4, wherein the end of the main rod is configured to be received in a housing in the valve, and wherein the stud comprises a stop surface arranged to hold the end in the housing when the stud is in the activated position.

6. Device according to claim 1, further comprising a coupling return configured to return the coupling to its deactivated configuration.

7. Device according to claim 1, comprising a hydraulic chamber delimited at one extent by the main piston and at another extent by the fixing piston.

8. Device according to claim 1, wherein the main rod passes through the fixing piston.

9. Device according to claim 8, wherein the driving device is configured so that the main piston, the fixing piston and the coupling piston are controlled by a control unit by means of three hydraulic connections, namely:
   a first connection between the unit and a hydraulic chamber delimited by the main piston and the fixing piston,
   a second connection between the unit and a hydraulic chamber delimited by the main piston and the driving device exterior casing, and
   a third connection between the unit and a channel connecting both a hydraulic chamber delimited by the fixing piston and the driving device exterior casing and a hydraulic chamber delimited by the coupling piston and the driving device exterior casing.

10. Device according to claim 1, further comprising a valve unlocking device, wherein the valve is configured to be locked in the closed position, and wherein the coupler controller controls the valve unlocking device.

11. Assembly consisting of a device according to claim 1 and a regulation valve, further comprising a guidance element comprising a valve exterior housing receiving part of the driving device, a housing receiving part of the valve, and a valve—main rod coupler guide.

12. Device according to claim 1, mounted on a device selected from the group consisting of a regulation valve and a pouring ladle.

\* \* \* \* \*